SHOE HOLDER

Original Filed Jan. 28, 1969 2 Sheets-Sheet 1

PETER J. DALEY
INVENTOR.

BY Joseph S. Iandiorio

ATTORNEY.

PETER J. DALEY
INVENTOR.

BY Joseph S. Sandiorio

ATTORNEY.

United States Patent Office

Re. 28,001
Reissued Apr. 30, 1974

28,001
SHOE HOLDER

Peter Joseph Daley, Stow, Mass., by Marlboro Wire Goods Company, Incorporated, Marlborough, Mass., assignee Original No. 3,537,594, dated Nov. 3, 1970, Ser. No. 794,649, Jan. 28, 1969. Application for reissue Mar. 29, 1972, Ser. No. 239,256
Int. Cl. A47f *7/08*
U.S. Cl. 211—37 19 Claims

Matter enclosed in heavy brackets [ ] appears in the original patent but forms no part of this reissue specification; matter printed in italics indicates the additions made by reissue.

ABSTRACT OF THE DISCLOSURE

Apparatus is disclosed for holding a pair of shoes together including a first pair of elements for engaging the toes of the shoes, a second pair of elements for engaging the heels of the shoes and interconnection means for connecting the first and second pairs of elements to each other to secure the shoes together, at least a part of one of the pairs of elements or the interconnection means being resilient.

BACKGROUND OF INVENTION

This invention relates to shoe holder apparatus.

Contemporary devices for securing shoes and boots together so that they may be easily carried and so that warping, particularly in ski boots, may be prevented have a number of shortcomings. Some are large, heavy and awkward to use and are not easily carried on the person when not in use. A good many of them must be adjusted when installed on the boots, others require that they be moistened upon use in order to tightly hold the boots. When some holders are engaged with the shoes, they are not capable of being set down in a freestanding position with the heels or toes pointing upward: they would simply tumble to a position in which they are on their side or backs which is not desirable if they must be left in snow or other undesirable atmosphere.

SUMMARY OF INVENTION

It is therefore an object of this invention to provide an improved shoe holder which is small, lightweight, compact, collapsible, and may be easily carried folded in a pocket or the like when not in use.

It is therefore an object of this invention to provide an improved shoe holder which may be installed on a pair of shoes quickly, easily and without a need for adjustment and which may be collapsed and folded to pocket size.

It is therefore an object of this invention to provide an improved shoe holder which when installed on the shoes permits the shoes and holder as a unit to be free standing in an upright position.

The invention may be accomplished by shoe holder apparatus including a pair of toe elements swingably connected with each other and adapted to grip the toes of a pair of shoes. A pair of heel elements are swingably connected with each other and are adapted to grip the heels of a pair of shoes. Interconnection means are provided for connecting the pairs of heel and toe elements together. At least a part of one of the pairs of elements and interconnection means are resilient.

In preferred embodiments a handle is provided and either the toe elements or heel elements or both pairs of elements include stand members for enabling the shoes and shoe holder apparatus to form a freestanding unit.

DISCLOSURE OF PREFERRED EMBODIMENT

Other objects, features and advantages will occur from the following description of a preferred embodiment and the accompanying drawings, in which.

Figure 1:
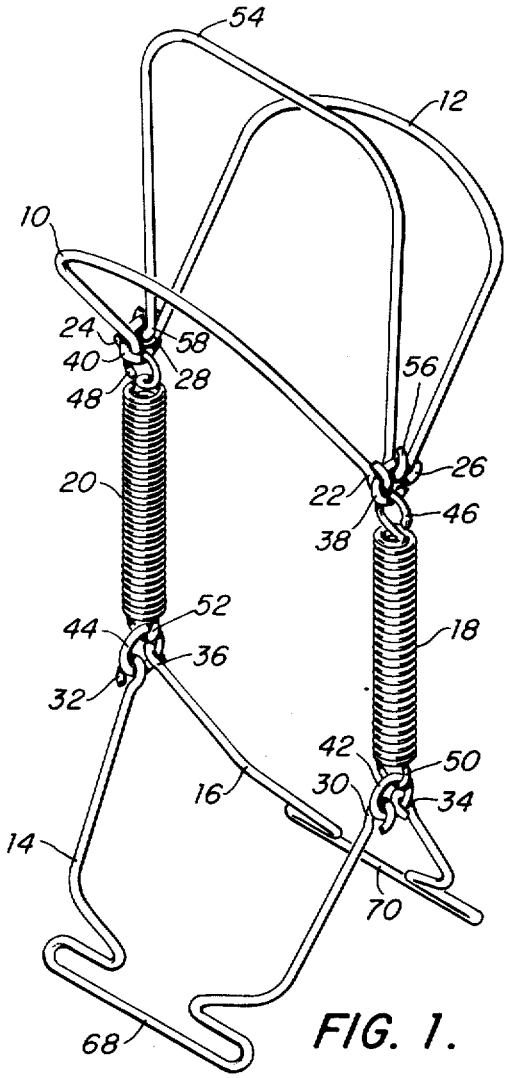
FIG. 1 is an axonometric view of a shoe holder apparatus according to this invention.

The invention may be embodied in apparatus having a first pair of shoe engaging pieces 10, 12 connected to a second pair of shoe engaging pieces 14, 16 by springs 18 and 20, FIG. 1. Each piece 10, 12, 14, and 16 is bent or curved, i.e. inflected to facilitate its function of engaging the end of a shoe or boot, i.e. either the toe above the welt or the back of the shoe just above the heel. At each end of each of the pieces is a means for engaging a spring or connection member. In this embodiment piece 10 has eyes or loops 22, 24; piece 12 has loops 26, 28; piece 14 has loops 30, 32; piece 16 has loops 34, 36.

Figure 1A:
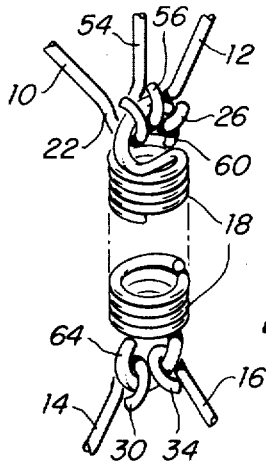
FIG. 1A is an axonometric view of a portion of a shoe holder similar to that shown in FIG. 1 having alternative means for interconnecting the heel and toe pieces with the springs.

Pieces 10 and 12 may be swingably connected to each other and to springs 18 and 20, and pieces 14 and 16 may be swingably connected to each other and to springs 18 and 20 directly or by connection means such as rings 38, 40, 42, and 44. Ring 38 interconnects loops 22 and 26 and hook 46 of spring 18. Ring 40 interconnects loops 24 and 28 and hook 48 of spring 20. Ring 42 interconnects loops 30 and 34 and hook 50 of spring 18. Ring 44 interconnects loops 32 and 36 and hook 52 of spring 20. A handle 54 having loops 56, 58 may be connected with rings 38 and 40, as shown, or with rings 42 and 44. The interconnecting function of rings 38, 40, 42, and 44 may be performed by various other means. For example, the hooks 60 and 64, FIG. 1A, may be used in place of rings 38 and 42.

A stand piece 68, 70 may be connected to each piece 14 and 16 and/or each piece 10 and 12 to enable the apparatus to stand upright when installed on a pair of shoes. The stand pieces may be integrally, movably, collapsibly or removably connected with the shoe engaging pieces.

Figure 2:
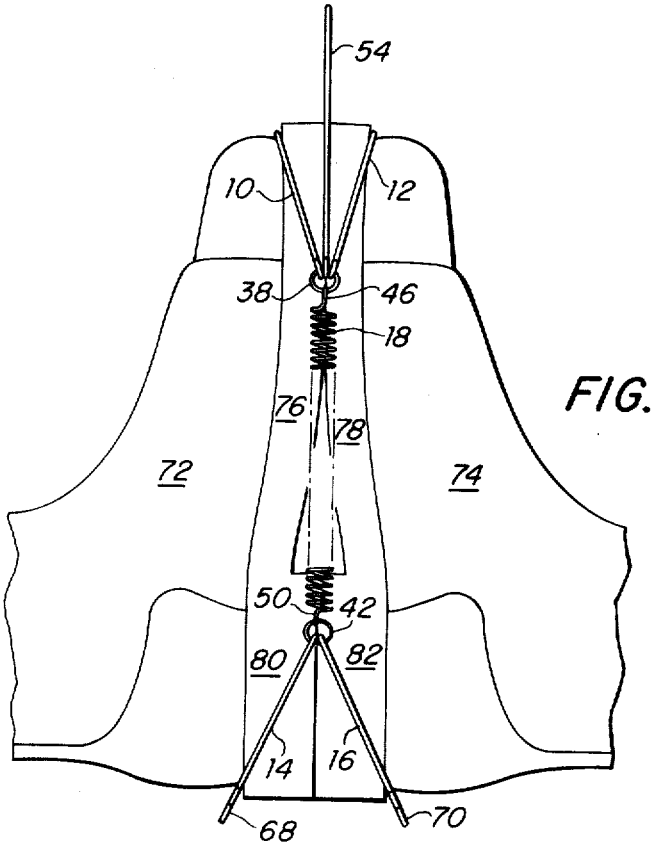
FIG. 2 is a side view of the apparatus of FIG. 1 shown installed on a pair of ski boots.

The shoe holding apparatus of FIG. 1 is shown installed on a pair of boots 72, 74, FIG. 2, arranged in sole 76 to sole 78 and heel 80 to heel 82 relationship. Pieces 10 and 12 engage the toes and pieces 14 and 16 the heels of boots 72, 74. However, both boots may be inverted so that pieces 10 and 12 grip the heels and pieces 14 and 16 grip the toes or one of the boots may be inverted so that pieces 10 and 16 grip the toes and pieces 12 and 14 grip the heels.

Figure 3:
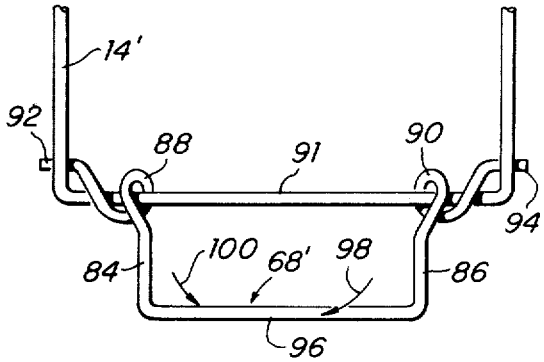
FIG. 3 is a front view of a portion of a toe or heel holding element including a collapsible stand member.
Figure 4:
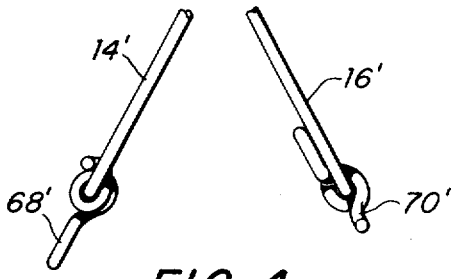
FIG. 4 is a side view of a portion of a pair of toe or heel holding elements including collapsible stand members, one of which is extended and one of which is collapsed.

A collapsible stand piece 68' is shown associated with a shoe engaging piece 14' in FIG. 3. Bars 84 and 86 have curled portions 88, 90, wound about element 91, which terminate in ends 92, 94 respectively, that bear against piece 14' on the opposite side from the junction of the bars 84, 86 and curled portions 88, 90. Pressure on base 96 of stand piece 68' in the direction of arrow 98, into the paper in FIG. 3, does not move piece 68' because of the blocking action of ends 92, 94, whereas pressure on base 96 in the direction of arrow 100, out of the paper in FIG. 3, rotates piece 68' about element 91 and collapses the stand piece 68' against the shoe engaging to piece 14'. This action may be better understood with relation to FIG. 4 where shoe engaging pieces 14' and 16' are shown in side view with stand piece 68' in the full extended position and stand piece 70' in the fully collapsed position.

Figure 5:
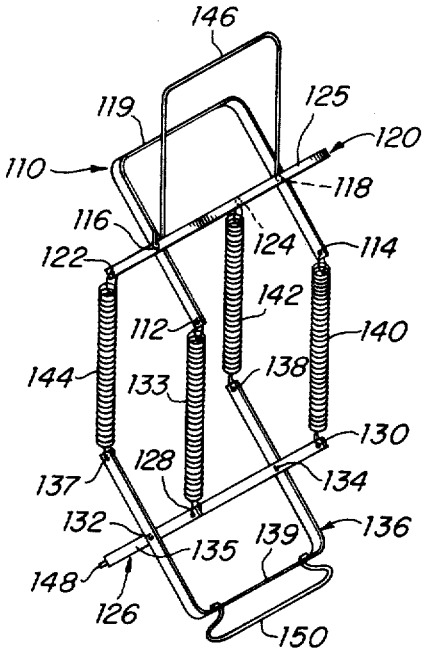
FIG. 5 is an axonometric view of another embodiment of the invention in which the shoe engaging pieces are arranged for scissor action.

In another embodiment the shoe engaging pieces are pivoted together to provide scissor action as shown in FIG. 5. Shoe engaging piece 110 having holes 112, 114 is pivotally connected at pins 116, 118, between the inflected part 119 and holes 112, 114, to shoe engaging piece 120 having holes 122 and 124 at points between the inflected part 125 and holes 122, 124. Shoe engaging piece 126 having holes 128, 130 is pivotally connected at pins 132, 134 between inflected part 135 and holes 128, 130 to shoe engaging piece 136 having holes 137, 138, at points between the inflected part 139 and holes 137, 138. Pieces 110 and 120 are resiliently connected with pieces 126 and 136 by means of springs 133, 140, 142, and 144 connected between holes 112 and 128, 114 and 130, 124 and 138, and 122 and 137. A handle 146 may be connected with one pair of shoe engaging pieces such as at pins 116 and 118 and stand pieces 148, 150 may be connected with one or both of the pairs of shoe engaging pieces such as on pieces 126 and 136.

Figure 7:
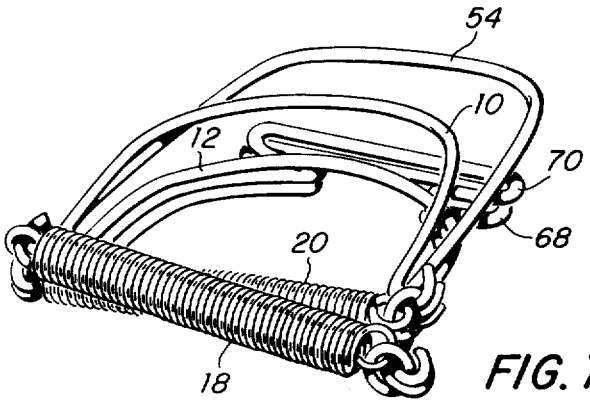
FIG. 7 is an axonometric view of the holder of FIG. 1 folded into a compact arrangement.
Figure 6:
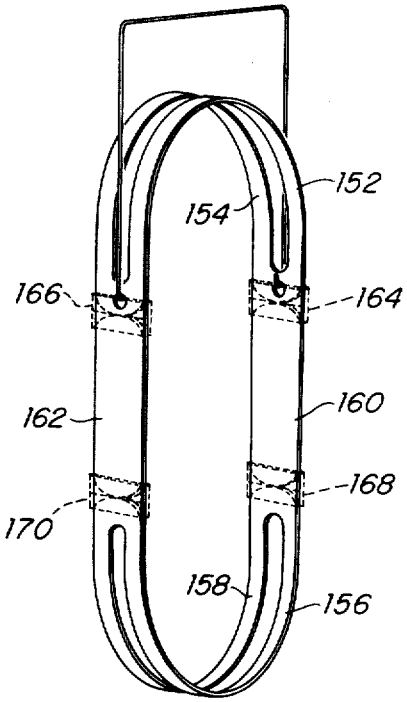
FIG. 6 is an axonometric view of another embodiment of the invention in which the apparatus is made of one piece of resilient material.

The entire apparatus may be made out of a resilient material such as springs or rubber as shown in FIG. 6, where the shoe engaging pieces 152, 154, 156, and 158 as well as the interconnecting webs 160, 162 are resilient material, such as rubber. Alternatively, the webs 160, 162 may be nonresilient and pieces 152, 154, 156, 158 may be resilient, or the apparatus may be formed in three parts, such that the first part, pieces 152, 154 are connected to the second part, webs 160, 162 by clamps or fasteners 164, 166 shown in phantom, respectively, and webs 160, 162 are connected to the third part, pieces 156, 158 by fasteners 168, 170, shown in phantom, respectively. A stand element or elements may be attached to fasteners 164, 166 or 168, 170 or to pieces 152, 154 or 156, 158 or webs 160, 162. The holder of FIG. 1 is shown folded into a small, compact arrangement in FIG. 7.

Various arrangements and types of parts may be combined to implement this invention. For example, the resilient means may be one or more springs in tension or compression, rubber or rubberlike elements or any component or components that permit the device to be stretched out to fit the shoes and bias the pairs of shoe engaging pieces towards each other. The different parts of the apparatus may be made of any suitable type of material such as metal, wood, plastic, etc., and may be made with castings, extrusions, moldings, wires, bands or other suitable forms. The shoes engaging pieces may be hinged together or may be molded in pairs with a webbing connecting them that acts as a hinge or pivot. One or both pairs of shoe engaging pieces may be made of resilient material and the interconnection means may be nonresilient, or parts of one or both of the shoe engaging pieces in one or both pairs of shoe engaging pieces and/or parts of the interconnection means may be made of resilient material.

I claim:

1. Shoe holder apparatus *for a pair of shoes with the sole-heel surfaces in face-to-face disposition, said apparatus* comprising.

(*A*) a first portion including a first pair of first and second elements swingably connected with each other, each of said elements being adapted to grip the end of a shoe, (*B*) a second portion including a second pair of third and fourth elements swingably connected with each other, each of said elements being adapted to grip the end of a shoe, and (*C*) a third portion including *resilient tension* means for interconnecting said first and second portions[, at least one of said portions being resilient.] *and resiliently urging them toward each other when a pair of shoes is gripped therebetween, said tension means being collapsible to bring said first and second portions together in the absence of a pair of shoes gripped therebetween.*

2. The apparatus of claim 1 in which each of said portions is formed of resilient material.

3. The apparatus of claim 1 in which said first portion is formed of resilient material.

4. The apparatus of claim 1 in which said third portion is formed of resilient material.

5. The apparatus of claim 1 in which each of said elements includes an inflected section for gripping the end of the shoe.

6. The apparatus of claim 5 in which each of said elements has first and second connection means.

7. The apparatus of claim 6 further including a first set of connection members including a first connection member for swingably interconnecting said first connection means of said first and second elements, and a second connection member for swingably interconnecting said second connection means of said first and second elements, and a second set of connection members including a third connection member for swingably interconnecting said first connection means of said third and fourth elements, and a fourth connection member for swingably interconnecting said second connection means of said third and fourth elements.

8. The apparatus of claim 1 further including handle means interconnected with one of said first and second pairs of elements.

9. The apparatus of claim 7 further including handle means interconnected with one of said first and second sets of connection members.

10. The apparatus of claim 1 in which each of said elements in at least one of said first and second pairs of elements includes a stand member for maintaining the shoes and holder apparatus in an upright position.

11. The apparatus of claim 10 in which each said stand member is fixed to its associated said element.

12. The apparatus of claim 10 in which each said stand member is integral with its associated said element.

13. The apparatus of claim 10 in which each said stand member is collapsibly associated with its associated said element.

14. The apparatus of claim 7 in which said means for interconnecting includes a first resilient member interconnecting said first and third connection members.

15. The apparatus of claim 14 in which said means for interconnecting includes a second resilient member interconnecting said second and fourth connection members.

16. The apparatus of claim 15 in which said first and second resilient members include spring means.

17. The apparatus of claim 6 in which said first and second elements are swingably connected at pivot points between their respective said connection means and their respective said inflected section, and said third and fourth elements are swingably connected at pivot points between their respective said connection means and their respective said inflected sections.

*18. Shoe holder apparatus for a pair of shoes with the sole-heel surfaces in face-to-face disposition, said apparatus comprising*

(*A*) *a first pair of first and second shoe-engaging elements and a second pair of third and fourth shoe-engaging elements, each said element having*

(*1*) *first and second opposed ends with a connection means on each said end, and*

*(2) a median portion between said ends and adapted to grippingly encircle the end of a shoe,*

*(B) a pair of resilient elongated interconnecting elements, each of which has connection means at each end thereof,*

*(1) one interconnecting element having said connection means at one end thereof swingably interconnected with said connection means at said first ends of said first and second elements and having said connection means at the other end thereof swingably interconnected with said connection means at said first ends of said third and fourth elements,*

*(2) the other interconnecting element having said connection means at one end thereof swingably interconnected with said connection means at said second ends of said first and second elements, and having said connection means at the other end thereof swingably interconnected with said connection means at said second ends of said third and fourth elements,*

*(3) so that said elements of each of said first and second pairs thereof are swingably connected together at said ends thereof and said two pairs of shoe-engaging elements are resiliently joined together at said interconnected ends thereof, and*

*(4) said interconnecting elements being collapsible with said first and second pairs of elements in the absence of a pair of shoes gripped between said shoe-engaging elements.*

*19. In shoe holder apparatus for a pair of shoes with the sole-heel surface in face-to-face disposition, the improvement comprising*

*(A) first, second, third and fourth elements each of which has first and second connection means and is elongated between said connection means thereof with a shoe-engaging median section for grippingly encircling the end of a shoe, and*

*(B) connection means interconnecting said connection means of said first and second elements with said connection means of said third and fourth elements, said connection means interconnecting said elements with swingable interconnections that allow said first and second elements to collapse with said third and fourth elements in the absence of a shoe engaged therebetween,*

*(C) at least one of said connection means and said elements being resilient to urge said median sections of said first and second elements resiliently toward said median sections of said third and fourth elements when a pair of shoes in engaged therebetween.*

References Cited

The following references, cited by the Examiner, are of record in the patented file of this patent or the original patent.

UNITED STATES PATENTS

| | | | |
|---|---|---|---|
| 384,334 | 6/1888 | Reichenbach | 211—34 |
| 394,927 | 12/1888 | Ives | 211—37 |
| 1,310,281 | 7/1919 | Clark | 211—34 |
| 2,383,651 | 8/1945 | Hill | 211—34 X |
| 2,566,656 | 9/1951 | David | 15—267 |
| 2,586,665 | 2/1952 | Konikoff | 211—37 |
| 3,183,535 | 5/1965 | McAusland | 12—120.5 |
| 3,412,866 | 11/1968 | Binding | 211—37 |
| 3,183,535 | 5/1965 | McAusland | 12—120.5 |
| 3,412,866 | 11/1968 | Binding | 211—37 |

NILE C. BYERS, JR., Primary Examiner

U.S. Cl. X.R.

12—120.5